United States Patent [19]

Goedert

[11] Patent Number: 4,609,556
[45] Date of Patent: Sep. 2, 1986

[54] FILTER-BAGS FOR MEDICINAL AND AROMATIC INFUSIONS, METHOD AND APPARATUS

[76] Inventor: Nicolas Goedert, 21, Ro'dewé3264 Mamer, Luxembourg

[21] Appl. No.: 724,506

[22] Filed: Apr. 19, 1985

Related U.S. Application Data

[63] Continuation of Ser. No. 499,732, May 31, 1983, abandoned.

[30] Foreign Application Priority Data

May 28, 1982 [EP] European Pat. Off. ........ 82630058.4

[51] Int. Cl.$^4$ ..................... B65D 33/10; B65D 33/14; B65B 29/04
[52] U.S. Cl. ..................................... 426/394; 426/82; 426/410; 53/134; 53/413; 53/202; 53/555; 206/5
[58] Field of Search .................................. 426/77-79, 426/82, 83, 394, 410; 53/560, 454, 134, 413, 555, 553, 202

[56] References Cited

U.S. PATENT DOCUMENTS

| | | |
|---|---|---|
| 2,208,951 | 7/1940 | Tamassy ............................... 53/134 |
| 2,291,702 | 8/1942 | Downes . | |
| 2,377,118 | 5/1945 | Weisman ............................... 426/82 |
| 2,381,091 | 8/1945 | Weisman ............................... 53/554 |
| 2,861,403 | 11/1958 | Weisman ............................... 53/413 |
| 3,257,212 | 6/1966 | Kasket . | |

FOREIGN PATENT DOCUMENTS

| | | |
|---|---|---|
| 1002001 | 12/1976 | Canada . |
| 1153673 | 8/1963 | Fed. Rep. of Germany . |
| 674886 | 7/1952 | United Kingdom . |
| 789492 | 1/1958 | United Kingdom . |

Primary Examiner—Steven Weinstein
Attorney, Agent, or Firm—Schwartz, Jeffery, Schwaab, Mack, Blumenthal & Evans

[57] ABSTRACT

A filter-bag (1) for medicinal or aromatic infusions is provided with an exterior pocket (9) adapted to receive a tea or coffee spoon, thus permitting to maintain the filter-bag in the bottom of a cup (cf. FIGS. 2, 3 and 4).

A method for manufacturing a filter-bag according to the invention comprises sandwiching between two continuously traveling filterpaper webs heaps of plant-based product placed onto one of said webs, and partially welding an exterior paper web of reduced width onto one of said filterpaper webs, in welding said filter-bags shut and cutting them to smaller units.

Apparatus for manufacturing a filter-bag according to the invention substantially comprises two main spools (37, 38) continuously feeding two filterpaper webs (43, 55), a metering device (47, 46, 44, 45) for dispensing plant-based product, an additional spool (56) continuously feeding a paper web (57) of smaller width than said first or second paper webs and being attached onto one of the latter, a welding device (49, 50) and a cutting device (59, 60, 61, 62, 63, 64) (cf. FIGS. 9, 10, 11).

2 Claims, 11 Drawing Figures

FILTER-BAGS FOR MEDICINAL AND AROMATIC INFUSIONS, METHOD AND APPARATUS

This application is a continuation of application Ser. No. 499,732 now abandoned, filed May 31, 1983.

Medicinal and aromatic plant-based infusion products, such as tea, herbal tea, coffee and surrogate products may be provided in an easy-to-use, prepackaged and ready-for-use form. Specifically, they may be provided in little filter-bags made of porous paper, each of which is filled with a portion of product and is destined to be immersed into a cup or a glass of boiling water. However, on account of their lower apparent density than that of water, such filter-bags tend to float when placed into the water, resulting in decreased extraction efficiency of the active ingredients in comparison with a completely immersed tea bag.

In the past, attempts have been made to solve this problem by providing the user with some kind of a special plastic spoon having a right-angle configuration (cf. FIG. 1) into whose exterior fold a corner of the filter-bag could be nipped, thus allowing to maintain the filter-bag in the bottom of the cup or glass. The folded lower part of this special spoon is perforated and is adapted to softly press the filter-bag against the cup or glass bottom in order to completely extract the plant juice contained therein. However, this solution is becoming less and less attractive due to the ever-increasing cost of raw materials required for manufacturing this type of special spoon.

Therefore, it is an object of the present invention to provide a filter-bag adapted to be maintained by means of an ordinary spoon in the bottom of a cup or glass filled with water.

It is another object of the present invention to provide units of two or more filter-bags, wherein each filter-bag may be detached and maintained by means of an ordinary spoon in the bottom of a cup or glass filled with water.

It is another object of the present invention to provide a relatively simple and inexpensive method for manufacturing filter-bags such as those described above.

It is another object of the present invention to provide relatively simple and inexpensive apparatus allowing to implement a method such as one of those mentioned above.

In accordance with the invention, the first object is achieved in providing a filter-bag, at least one face of which is provided with a pocket adapted to receive the lower part of a coffee or tea spoon.

In accordance with the invention, the second object is achieved in providing two or several filter-bags connected to one another at respective edges and comprising a common, shared attachment sheet, or several such attachment sheets.

In accordance with the invention, the third object is achieved in providing a method of manufacture, wherein the filter-bags are substantially manufactured by welding two filterpaper webs in the circumference area of the product heaps placed between said filterpaper webs, and wherein the second filterpaper web is provided exteriorly with at least one third paper web partially welded to said second filterpaper web.

In accordance with the invention, the fourth object is achieved in providing manufacturing apparatus, substantially comprising two continuous-feed filterpaper spools, a feed hopper and a distribution headbox for dispensing the plant-based product, a metering cylinder, two cooperating welding cylinders, a rotary knife, and if optionally required a nip pulley with a counter-surface and a perforating knife, and a third continuous-feed paper spool, and tensioning cylinders downstream of said three continuous-feed spools.

BRIEF DESCRIPTION OF THE DRAWINGS

In the appended drawings

FIGS. 2 and 3 show two different views of a filter-bag according to the invention;

FIG. 4 shows the mode of utilization of a filter-bag according to the invention;

FIGS. 5 and 6 show two different views of a unit comprising coupled filter-bags;

FIG. 7 shows a view of another filter-bag in accordance with the invention;

FIG. 8 shows a view of another unit comprising coupled filter-bags;

FIG. 9 shows a flow-sheet of a preferred manufacturing method of the filter-bag unit shown in FIGS. 4 and 5;

FIG. 10 shows a preferred manufacturing apparatus adapted to manufacture the units of filter-bags shown in FIGS. 4 and 5;

FIG. 11 shows a preferred apparatus adapted to manufacture the filter-bag shown in FIGS. 2 and 3.

Reverting to the preferred embodiment of the invention of FIGS. 2 and 3, there is shown a filter-bag 1 comprising two porous paper sheets 2, 3 welded face-to-face by means of their respective edges 4, 5, the assembly having a double pouch 6, 7 filled with a medicinal or aromatic plant-based product to be extracted. Frontal face 8 of the filter-bag is provided with a porous paper pocket 9 whose lower edge 10 is welded to the lower edge 11 of the filter-bag, and whose lateral edges 12, 13 are welded to the lateral edges 14, 15 of the filter-bag. Upper edge 16 of the pocket is loose and may yield away from the filter-bag pouch, thereby slightly folding the latter. Thus, the lower part of a coffee or tea spoon may be inserted into said pockets (cf. FIG. 4), thus allowing to maintain the filter-bag in the cup or glass bottom under the influence of the weight of the spoon.

FIGS. 5 and 6 show another preferred embodiment of the invention. On these figures, a first filter-bag 17 having a double pouch 32, 33, is connected at its lower edge 18 to the lower edge 19 of a second filter-bag 20 having a double pouch 34, 35. The frontal face 21 of said first filter-bag is provided with a pocket 22 and the frontal face 23 of said second filter-bag is provided with a pocket 24, said two pockets being comprised of a common sheet 25, one portion of which extends over said first filter-bag and another portion of which extends over said second filter-bag. The median portion of said sheet is heat-laminated onto the area comprised of the two lower edges 18, 19 placed end-to-end, whereas the lateral edges 26, 27 of said sheet are heat-laminated onto both sides on the respective lateral edges 28, 29 of the coupled filter-bags. The connection between the two lower edges 18, 19 placed end-to-end of the two filter-bags is weakened, for instance by means of perforations 30, which permits to readily separate the two filter-bags in order to use them separately. Separated or considered individually, each of said two filter-bags resembles the filter-bag of the first preferred embodiment and behaves similarly.

FIG. 7 shows another preferred embodiment of a filter-bag 31 in accordance with the invention similar to the one of FIG. 2, with the difference that its pocket 32 has its loose edge oriented diagonally with respect to the filter-bag.

FIG. 8 shows another preferred embodiment of a unit 33 comprising coupled filter-bags 34, 35 similar to that of FIG. 5, with the difference that the unit is provided with a pocket sheet 36 in slanted relationship with respect to said unit.

It is obvious that one or several filter-bag side or sides may have a curved edge rather than a straight edge.

Figure 1:
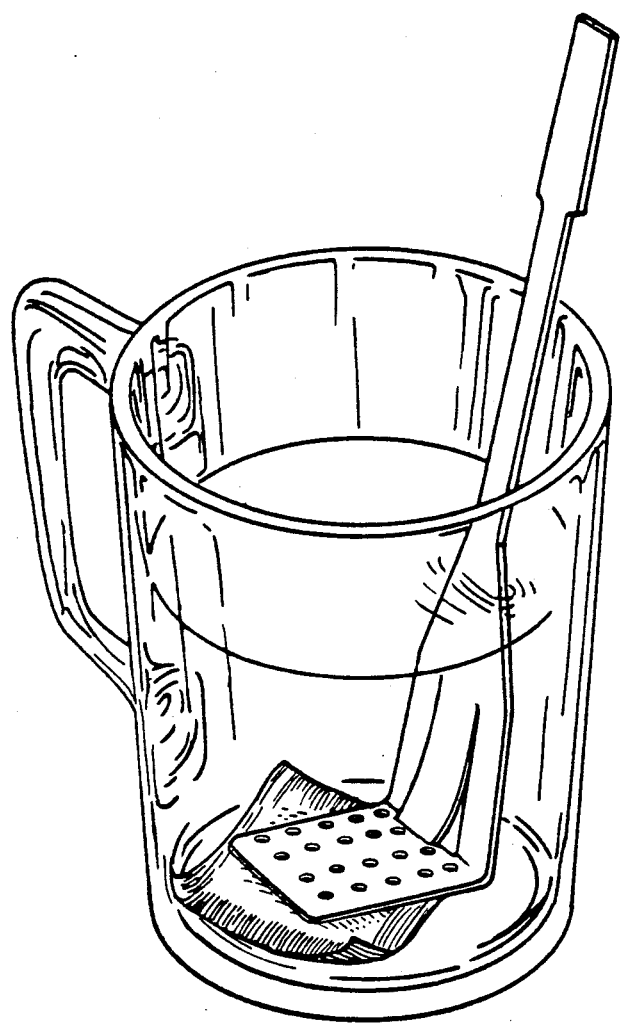
FIG. 1 shows the prior art and solution to the problem.
Figure 2:
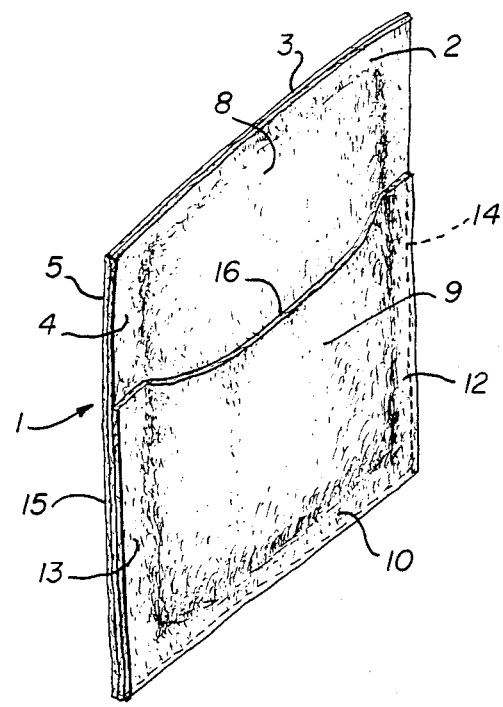
FIGS. 2 to 11 show preferred embodiments of the invention, specifically.
Figure 3:
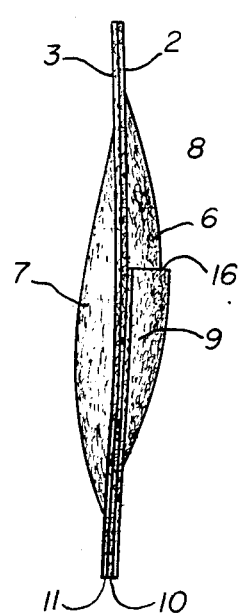
Figure 4:
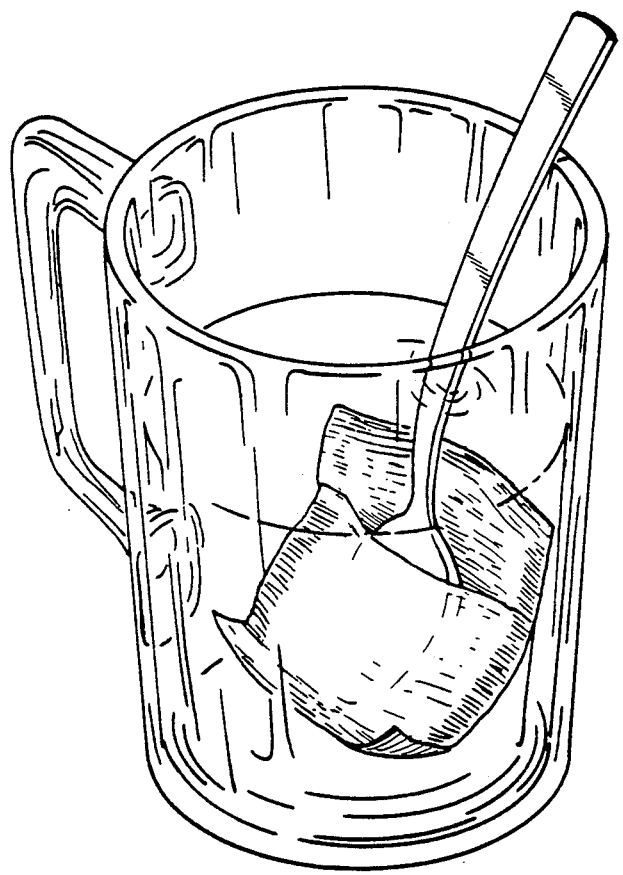
Figure 5:
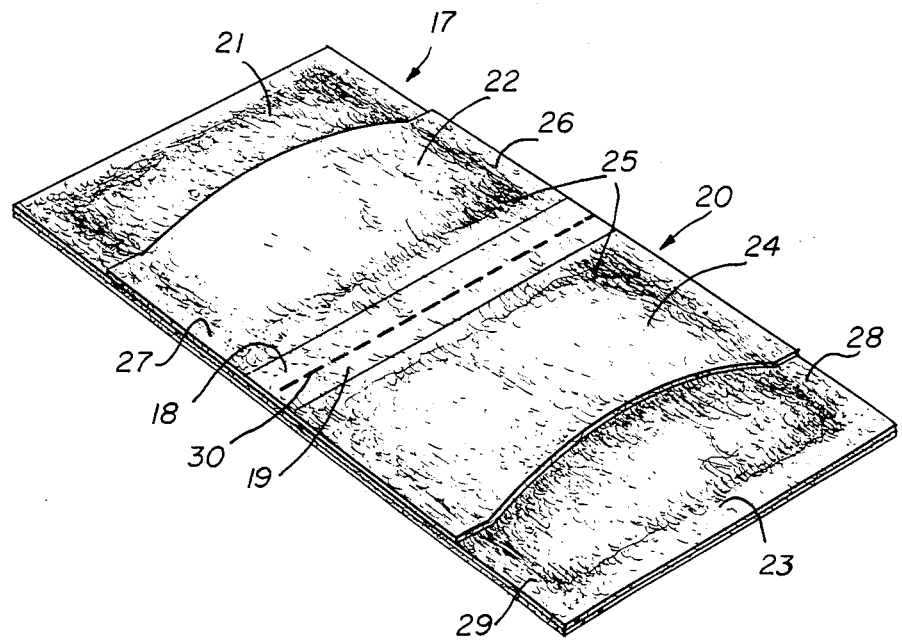

It is also obvious that units may be provided comprising three or four or more coupled filter-bags by means of a judicious combination of the preferred embodiments of FIG. 2 and of FIG. 5.

Figure 6:
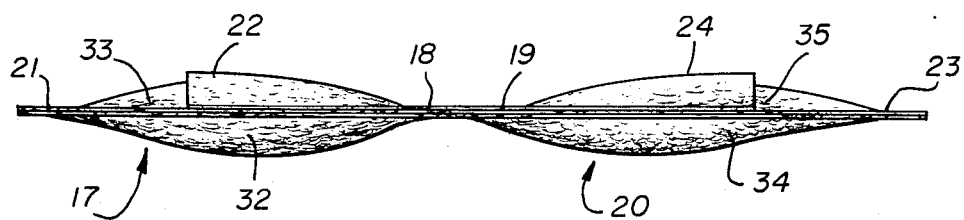
Figure 7:
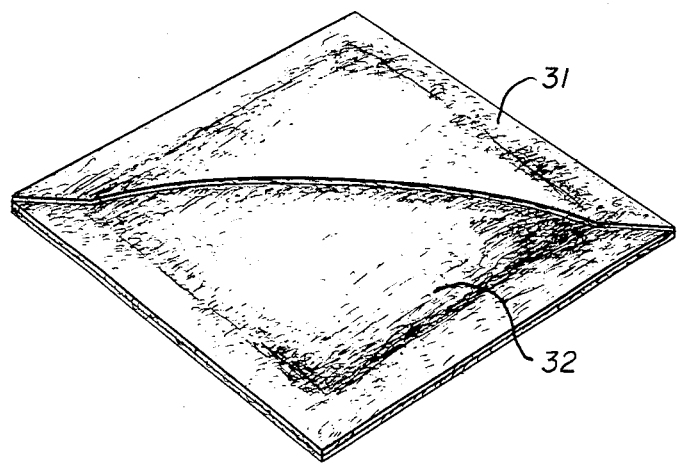
Figure 8:
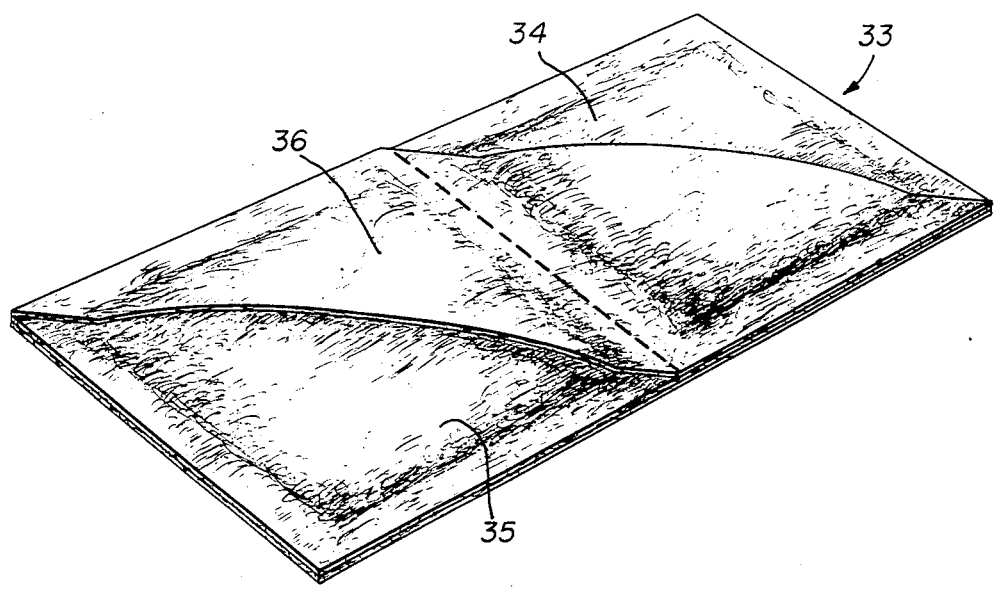
Figure 9:
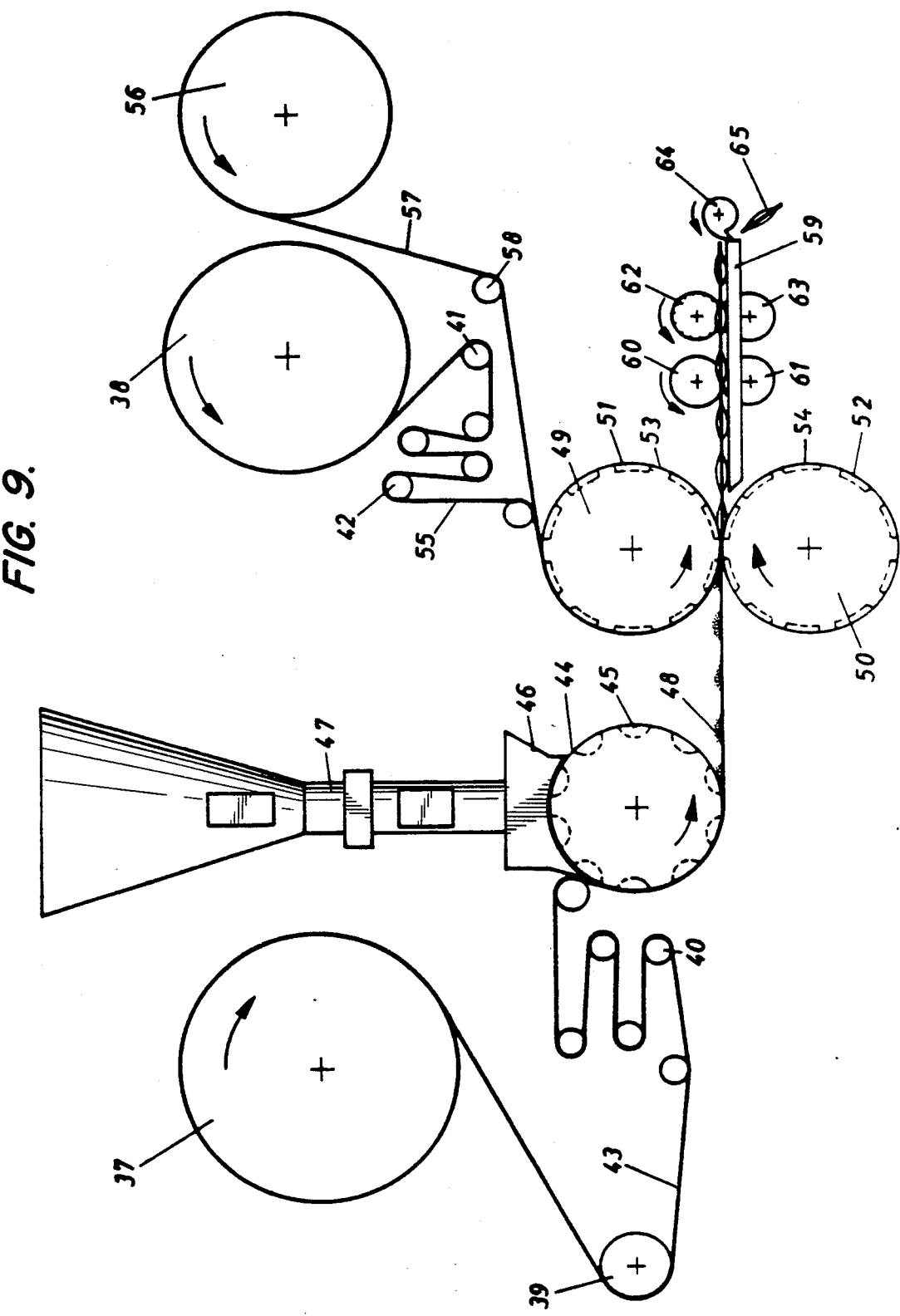
Figure 10:
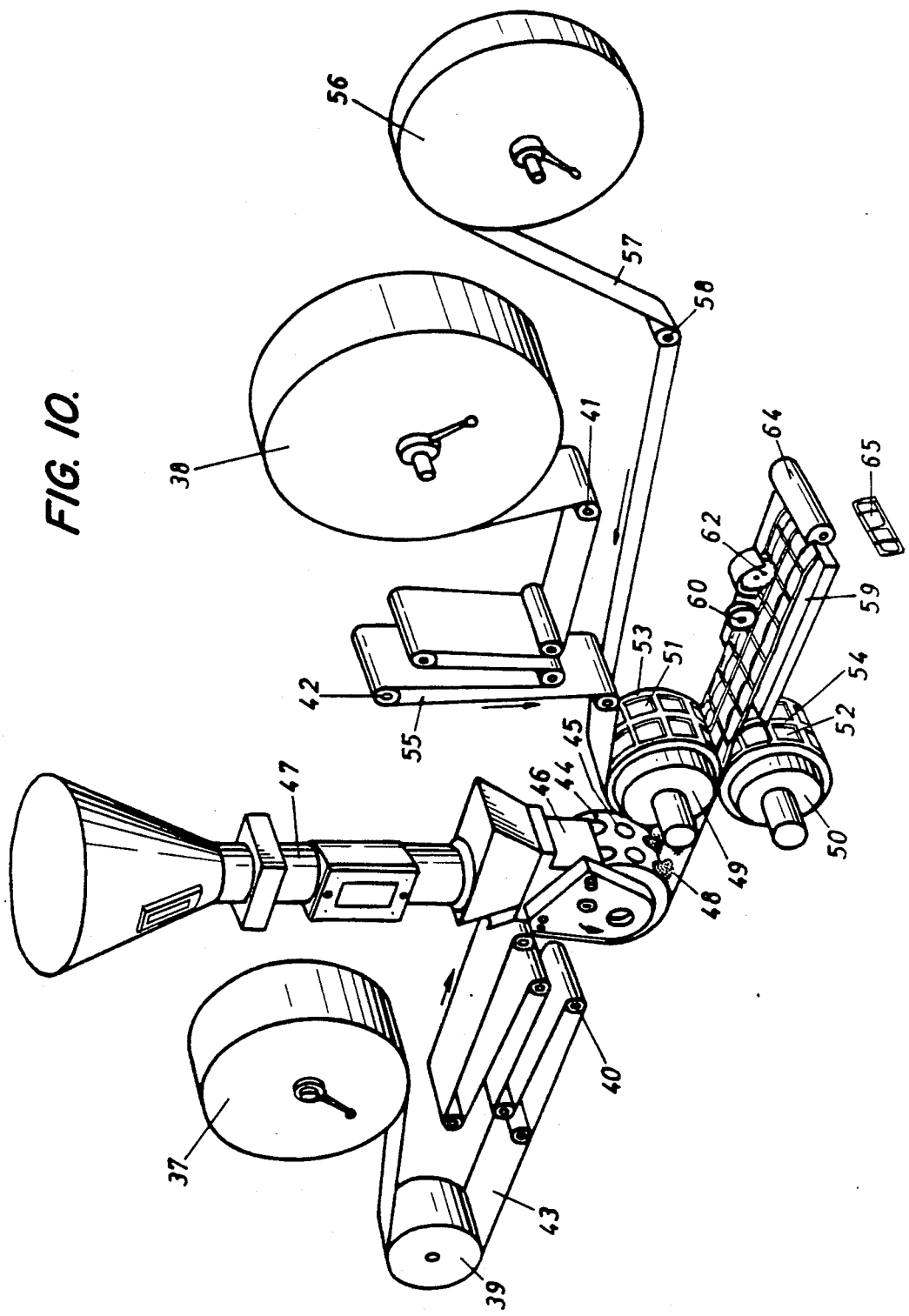

FIG. 9 shows a preferred method flow-sheet for the manufacture of filter-bag units such as those depicted in FIGS. 5 and 6, and FIG. 10 shows preferred apparatus for manufacturing said units. Substantially, there is shown a first continuous-feed filterpaper spool 37 and a second continuous-feed filterpaper spool 38. Downstream of each of said spools there are located one or more tensioning cylinders, e.g., 39, 40; or 41, 42 respectively. The first filterpaper web 43 travels in such a manner as to wrap around a product-metering cylinder 44 describing an arc of about 90 degrees, for instance located in the third trigonometric quadrant from top to bottom. Said metering cylinder is provided with circumferential pairs of metering cells 45 into which a distribution headbox 46 places the plant-based product to be packaged, said distribution headbox being topped by a feed hopper 47. During rotation of said metering cylinder, heaps of product 48 are placed onto the first filterpaper web, which then travels into the nip of a pair of welding cylinders 49, 50, cooperating and positioned in a vertical mirror-image configuration. Said welding cylinders have concave receiving cells 51, 52 and heated welding surfaces 53, 54 which are heated for instance by means of water vapor. The second filterpaper web 55 wraps around the top welding cylinder 49 describing an arc of 180 degrees located in the second and third trigonometric quadrant from top to bottom.

Moreover, the invention comprises a third continuous-feed paper-spool 56 from which travels a third filterpaper web 57 wrapping around a deviation cylinder 58 located downstream so as to feed said third paper web between said second filterpaper web and the top welding cylinder. However, said third paper web is narrower than said two other filterpaper webs, and it is placed in a rider position on the median longitudinal line of said two other paper webs placed face-to-face. Said welding cylinders act to weld said second filterpaper web onto said first filterpaper web all around the circumference area of each product heap, while said third paper web is simultaneously welded onto said second filterpaper web, but only at part of the circumference area around each product heap.

The double row of filter-bags provided with pockets thus formed is made to travel over a support table 59, and on top of its median line rides a nipping pulley 60 pressing onto a counter-surface 61 and a rotary longitudinal perforating knife 62 cooperating with a rotary support surface 63. A transverse rotary knife 64 individually cuts off the coupled filter-bag units 65 at the end of said support table.

Figure 11:
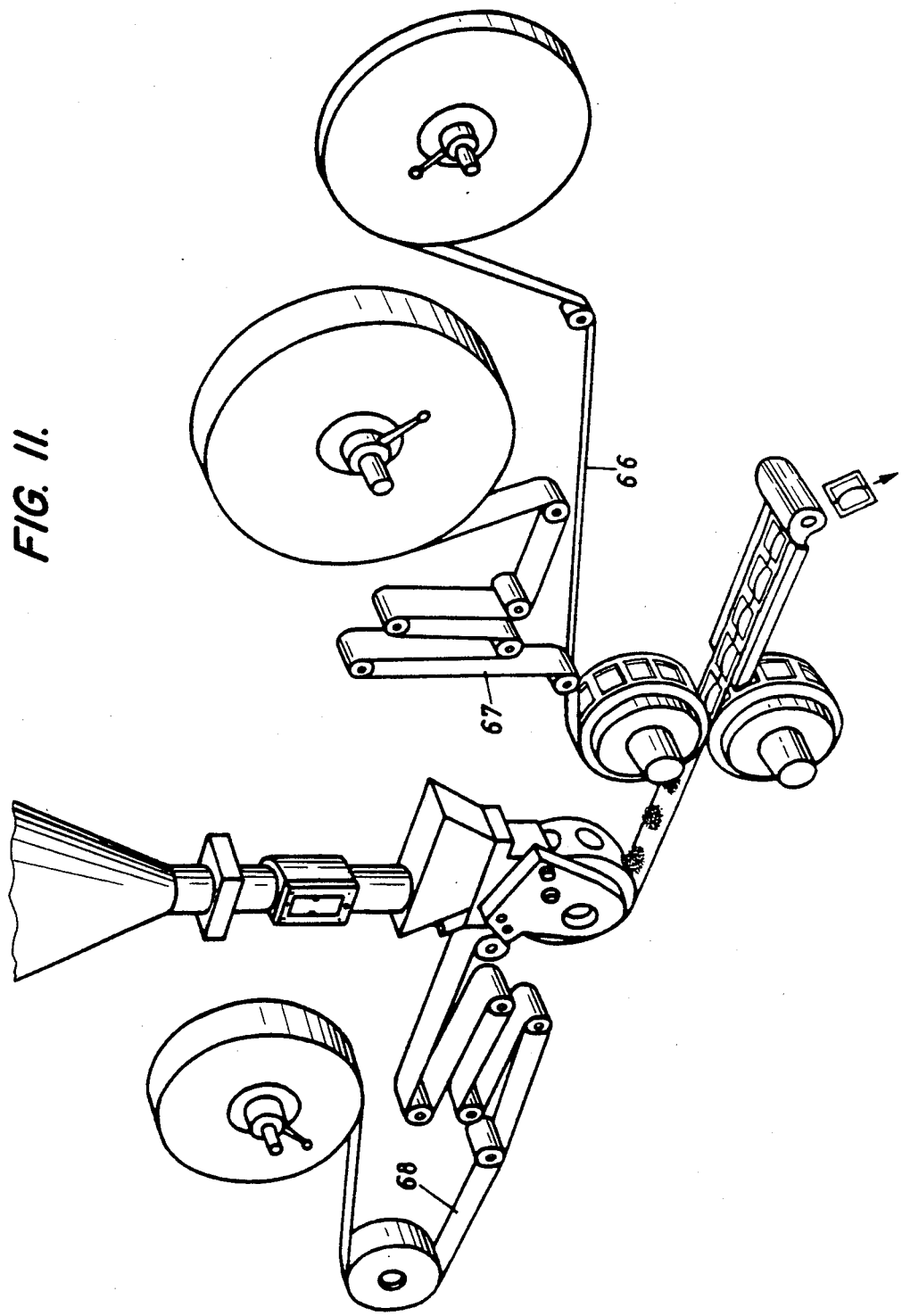

FIG. 11 shows a preferred apparatus for manufacturing the individual filter-bags of FIG. 2. This apparatus is similar to that of FIG. 10, except that only a single row of filter-bags is produced and that as a result there is no nipping pulley nor perforating knife, and except that the third paper web 66 is substantially displaced towards one of the longitudinal edges of said row with respect to the median line of said two other filterpaper webs 67, 68 rather than being in a rider position.

While several embodiments of the invention have been described, it will be understood that it is capable of still further modifications and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

I claim:

1. A method for manufacturing infusion filter-bags, comprising placing metered heaps (48) of plant-based infusible product in pairs side by side on a continuous filterpaper web (43) using a rotary metering device, and covering said heaps with a second continuous filterpaper web (55) having substantially the same dimensions as said first filterpaper web, covering said second filterpaper web with at least a third continuous paper web which is narrower than the second paper web over a central portion of said second paper web and fed longitudinally with respect to the second paper to partially cover the second paper web (57) and welding said three paper webs together by contacting said three paper webs with two opposed continuously rotating rotary welding cylinders having concave cells for receiving said heaps, and having mating welding surfaces welding said three paper webs together in the area of a circumference portion of each heap to form a double row of filter bags while leaving the longitudinal edge portions of said third paper web unwelded such that said third paper web forms a pocket for each filter bag which is larger than a spoon which is to be received in said pocket and such that said pocket will loosely receive said spoon, and cutting off units (65) having one or more filter-bags thus produced.

2. An apparatus for manufacturing infusion filter-bags comprising:
a first continuous-feed filterpaper (43) spool for feeding a first filterpaper web (37), a second continuous-feed filterpaper (55) spool (38) of substantially the same or near the same dimensions as said first spool for feeding a second filterpaper web, tensioning cylinders (30, 40; 41, 42) downstream of each spool for tensioning said filterpaper webs, a feed hopper (47) connected to a distribution headbox (46) for dispensing a plant-based infusible product, a rotary metering cylinder (44) having circumferentially spaced pairs of side by side metering cells (45) for receiving said product from said feed hopper and depositing said product directly on one of said filter paper webs in pairs of side by side heaps, two rotary cooperating welding cylinders (49, 50) having pairs of side by side welding surfaces (53, 54) and pairs of side by side concave receiving cells (51, 52), said welding cylinders receiving filterpaper webs from said first and second spools, and at least a third continuous-feed paper (57) spool (56) of reduced width relative to said first and second spools for feeding a third filterpaper web, and at least a deviating cylinder (58) downstream of said third spool for tensioning said third filterpaper web, and adapted to cover the second filterpaper web (55) fed by said second continuous-feed spool (38) with said third filterpaper web (57) only over a central portion of said second filterpaper web and in such a manner as to feed said third filterpaper web from said third spool longitudinally with the second filterpaper web from said second spool into said welding cylinders wherein said cooperating welding cylinders provide mating concave cells for receiving said heaps and mating welding surfaces for welding said three paper webs together in the area of a circumference portion of each heap such that said three webs are welded together simultaneously to form a double row of filter bags while leaving the longitudinal edge portions of said third filter paper web unwelded such that said third filterpaper web forms a pocket for each filter bag which is larger than a spoon which is to be received in said pocket and such that said pocket will loosely receive said spoon.

* * * * *